April 19, 1949.  K. M. McPHEE  2,467,902
SHAFT COUPLING
Filed Aug. 18, 1945
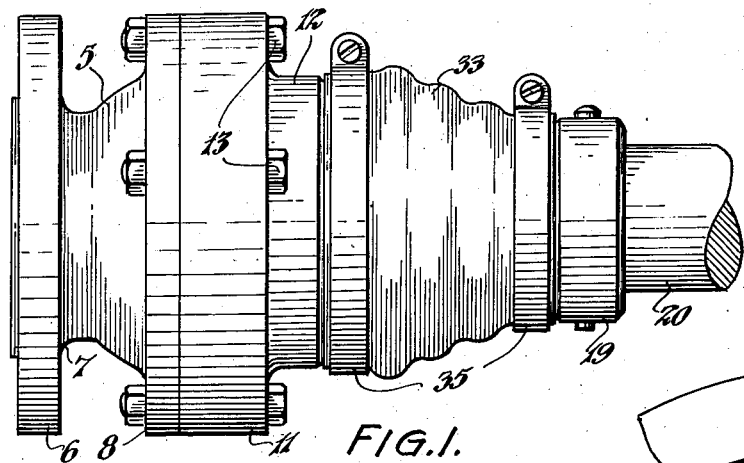
FIG.1.
FIG.5.
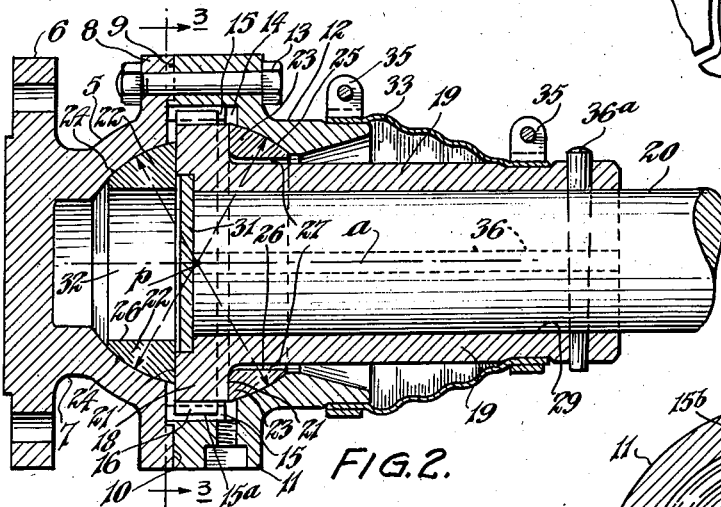
FIG.2.
FIG.3.
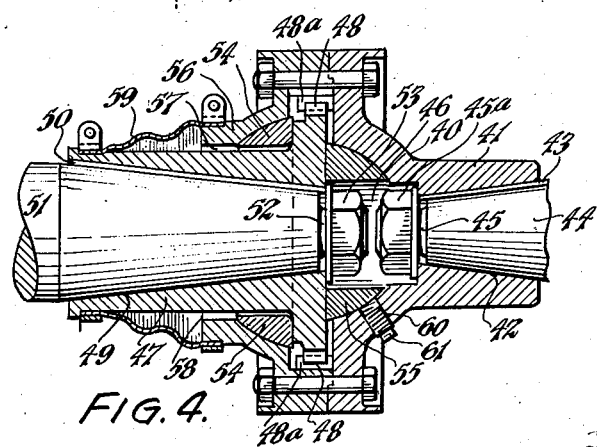
FIG.4.
Inventor:
Keith Morrison McPhee
By Williams, Bradbury & Hinkle
Attorneys.

Patented Apr. 19, 1949

2,467,902

UNITED STATES PATENT OFFICE 2,467,902

SHAFT COUPLING

Keith Morrison McPhee, Balwyn, Victoria, Australia

Application August 18, 1945, Serial No. 611,351
In Australia April 27, 1945

6 Claims. (Cl. 64—9)

This invention relates to flexible couplings for joining drive and driven members and of the type in which the drive and driven members or shafts are coupled through an internal gear and a gear pinion arranged to provide for continuity of drive, during limited axial misalignment of said members or shafts.

The couplings specified are particularly useful for coupling the drive shaft to the tail shaft carrying the propeller of a ship, or in other machines wherein a substantially long driven shaft is employed and likely to set up whip or vibratory movements and thrust with resultant wear on the bearings.

While the above couplings are reasonably effective in providing for the axial misalignment between said drive and driven members, there is no provision for either relative angular movements to compensate for oscillatory or vibratory movement in the driven member, or means to take thrust in either direction by the latter member.

With the primary object of obviating the abovementioned disadvantages and provide for limited relative angular movements in all planes between the drive and driven members, I have devised an improved flexible coupling of the type herein specified wherein the teeth of the gear pinion freely mesh with and are provided with a peripheral clearance relatively to the teeth of the internal gear, and there is provided, a pair of segmental spherical blocks disposed one each side of and in engagement with the gear pinion, and complementary spherical seatings with which said blocks freely engage, said blocks and seatings being radial to a point on the axis of the coupling.

The arrangement is such that the free intermeshing of the abovementioned teeth permits axial misalignment between the shafts during which the pinion has a lateral movement relatively to and between the segmental spherical blocks. The disposition of said blocks and seatings provides in effect a ball joint within the coupling for relative angular movement of the drive and driven members, during which the teeth of the gear pinion move angularly relatively to but do not disengage from the teeth of the internal gear. Said blocks move in unison with the gear pinion on the complementary seatings in the coupling under the thrust exerted by said pinion during a vibratory movement of the drive or driven member. Whilst permitting the lateral and angular movement of the drive or driven members, the said blocks absorb the misalignment and strain imposed thereby and at the same time transmit the direct thrust in either direction to the gear box or prime mover.

The accompanying drawings depict practical arrangements of the flexible coupling according to this invention.

In these drawings:

Fig. 1 is an elevation of the coupling for direct drive connection to a gear box or prime mover.

Fig. 2 is a vertical central section of the coupling illustrated in Fig. 1.

Fig. 3 is a section taken on line 3—3 of Figure 2.

Fig. 4 is a longitudinal central section of the coupling in which a drive shaft is coupled to a driven shaft.

Fig. 5 is a fragmentary detail of the coupling illustrating the free meshing of the internal gear and pinion.

Referring to Figs. 1 to 3 of the drawings, the coupling comprises a casing having two complementary sections, one of which comprises the cup shaped section 5 flanged at each end, the outer flange 6 emanating from the base 7 of the cup constituting in this practical arrangement the drive member of the coupling and adapted for direct connection by the flange 6 to a complementary flange on the drive member of a gear box or prime mover. Alternatively the flange 6 may be attached to a flange upon the end of a drive shaft or another coupling. The inner flange 8 of the coupling section 5 is of equivalent diameter and is formed with an inner annular stepped face 9 to engage with a corresponding face 10 upon the flanged head 11 of the other open cylindrical section 12 of the coupling.

Coupling sections 5 and 12 are bolted together about the engaging faces of the flanges 8—11 by the circumferentially spaced bolts 13. The coupling section 12 around the annular recess 14 within the flanged head 11 is formed with a ring of gear teeth 15 comprising an internal gear. The internal gear 15 is normally concentric with and disposed in constant peripheral mesh with a gear pinion 16 formed upon a terminal flange 18 of a torque transmitting sleeve 19 in which the driven shaft 20 is fixed as hereinafter described.

The teeth of the gear pinion 16 loosely or freely mesh with the teeth of internal gear 15 and as will be noted in Figs. 2-4, the length of the teeth in the internal gear 15 exceeds that of the teeth in said pinion 16. Moreover, the relative depths of the teeth in the gear pinion 16 and the internal gear 15 are such that substantial clearances 15a are provided between the roots and faces of the meshed teeth in said gear and pinion, as clearly illustrated in Fig. 2, 4 and 5. Furthermore, a substantial clearance 15b is provided between the flanks or contact faces of the respective teeth of the gear 15 and the pinion 16, see particularly Fig. 5. As a consequence of the clearances 15a and 15b, peripheral clearances or interspaces are provided between the teeth of the gear 15 and pinion 16, which permit of relative movements of said pinion both laterally and angularly.

The terminal flange 18 carrying pinion 16 is formed with parallel sides which are machined to engage with the flag faces 21 of a pair of segmental spherical blocks 22—23 located one each side of said flange and gear pinion 16.

The segmental blocks 22—23 freely or slidably engage complementary spherical seatings 24—25 formed respectively in the cup shaped section 5, and associated cylindrical section 12 of the coupling.

Referring to Fig. 2 it will be seen that the segmental blocks 22—23 and complementary seatings 24—25 are concentric with and radial to a point p in the common axis a of the coupling and the gear pinion. Point a is fixed and normally constitutes the approximate centre of said pinion 16. The segmental spherical blocks 22—23 are centrally bored out as 26, said block 23 being of greater radius and having a bore 26 of greater diameter to provide a substantial clearance 27 relatively to the sleeve 19 extending through said block 23 and carrying the driven shaft 20.

The bore of the sleeve 19 at the inner end has an enlarged annular recess forming a seating for a disc plate 31 so as to provide a sealed chamber 32 comprising the bore of the segmental spherical block 22 and bottom of the cup shaped section 5 of the coupling, for the reception of lubricant.

A flexible sleeve 33 composed of reinforced fabric or other flexible oil resisting material e. g. the material marketed under the registered trade-mark "Neoprene" and of substantially frusto conical form is attached at the end to the cylindrical section 12 of the coupling and to the sleeve 19 adjacent to the outer end of the latter, to seal the coupling against the emission or escape of lubricant. Clips 35 are employed to detachably connect the flexible sleeve to the coupling section 12 and sleeve 19.

The driven shaft 20 is keyed to the sleeve 19 through the keyway 36 to rotate in unison with said sleeve, the diametrical pin 36a operating to normally prevent disengagement of the shaft 20 from the sleeve 19.

In the operation of the coupling illustrated in Fig. 1, the driven shaft 20 is constantly driven in unison with and by the drive member and the coupling sections 5—12 through the internal gear 15, gear pinion 16 and sleeve 19.

In the event of axial misalignment of the driven shaft 20 to the axis of the coupling the pinion 16 moves laterally between the segmental spherical blocks 22—23 relatively to the internal gear 15, without disengaging the latter.

The teeth on one side of pinion 16 advance towards the root of the intermeshing teeth of internal gear 15, whilst the diametrically opposite teeth move in a direction towards withdrawal from engagement with the teeth of said gear 15.

Relative angular movement of the driven shaft 20 in any direction under vibration, causes a pivotal or angular movement of the sleeve 19 and gear pinion 16 about the point p on axis a. This pivotal movement is achieved by the displacement of the segmental spherical blocks 22—23 on their complementary seatings 24—25. The force exerted by the pinion during deflection causes both of said blocks 22—23 to move in unison to accommodate the deflection and the return of the driven shaft 20 to alignment effects a return movement of the pinion 16 and resultantly said blocks to the normal position.

During the angular movement of the gear pinion 16 the teeth of the latter in consequence of the clearances 15a and 15b angularly move between the teeth of the internal gear 15, the length of the teeth of which latter is such to prevent disengagement of the intermeshing teeth.

As the segmental spherical blocks 22—23, internal gear 15, gear pinion 16, and sleeve 19 are immersed in lubricant, smooth transmission of the drive to the driven shaft 20 is achieved irrespective of the position of said shaft and wear of the parts is practically eliminated. The segmental blocks 22—23 also operate to absorb any strain imposed during angular or misaligning movements of the driven shaft and transmit the thrust from any direction to the gear box or prime mover.

Referring to Figure 4 the coupling illustrated is modified for inclusion between and to directly couple a drive shaft and a driven shaft. To that end the cup shaped section 40 of the coupling in lieu of the outer flanged end, is formed with a tubular extension 41 having a tapered bore 42 including a keyway and key 43 to secure therein, the correspondingly shaped end of the drive shaft 44. Shaft 44 has a reduced and threaded stem 45 projecting into the hollow chamber 46 of the cup shaped section 40 of the coupling, to receive the terminal nut 45a to retain the shaft in position.

The sleeve 47 carrying the gear pinion 48 to mesh with internal gear 48a, is reduced in length and provided with a tapered bore 49 having a keyway and key 50 to secure the end of the driven shaft 51 which is shaped to fit the tapered bore and formed with reduced stem 52 to receive the nut 53.

The segmental spherical blocks 54—55 are similarly arranged on each side of the gear pinion 48 and centrally apertured to accommodate the nuts 45a—53 and passage therethrough of sleeve 47, respectively.

The flanged cylindrical section 56 of the coupling is concentric with the sleeve 47 and a clearance 57 permits angular and misaligning movements of the sleeve and shaft 51.

The open end 58 of the cylindrical section 56 is enclosed by a flexible sleeve 59 composed of reinforced fabric or the like to prevent the emission of lubricant from the coupling and secured to the section 56 and the sleeve 47 as hereinbefore described. Lubricant is admitted to the chamber 46 through the tapped hole 60 in the cup-shaped section 40 of the coupling, a screwed plug 61 normally closing the hole.

In the coupling illustrated, each shaft 44 and 51 may describe angular movements by the displacement of the segmental blocks 54—55 and limited misalignment of said shafts is also permissible by the free engagement of and clearance between the teeth of said internal gear 48a and pinion 48 as hereinbefore described.

I claim:
1. In a flexible coupling of the type which includes an internal gear and a pinion disposed in coaxial relation to said gear with its teeth interengaged with those of the gear, the teeth of said pinion having a peripheral clearance relative to the teeth of the internal gear, a pair of members slidably engaged respectively with opposite faces of the pinion, said members having external spherically formed surfaces, and complementary spherical seatings in which the spherical surfaces of said members are free to slide or turn, the spherical faces of the members and seatings having a common center of curvature at the axis of the coupling.

2. In a flexible coupling according to claim 1, the said opposite faces of the pinion being parallel flat faces perpendicular to the axis thereof and the said members having flat faces slidably engaged with said faces of the pinion.

3. In a flexible coupling according to claim 1, both said members being axially apertured, a sleeve extending rigidly from said pinion and through the axial aperture of one of the members with substantial clearance between said sleeve and the member, and a drive transmission member secured to said sleeve.

4. In a flexible coupling according to claim 1, both said members being axially apertured, a sleeve extending rigidly from said pinion and through the axial aperture of one of the members with substantial clearance between said sleeve and the member, and a drive transmission member secured to said sleeve, the aperture of the other member forming a lubricant chamber.

5. In a flexible coupling according to claim 1, a casing having two complemental sections one of which is adapted to be driven, the other section having one end open, said members being seated in said sections respectively, the last mentioned section including an internal flange with the teeth of the internal gear formed thereon, said sections being separable adjacent the face of the said pinion, and a sleeve extending rigidly from the opposite face of said pinion and through the open end of said section of the casing on which the internal gear teeth are formed, the member in the other section having an axial aperture forming a lubricant chamber.

6. In a flexible coupling according to claim 1, a casing having two complemental sections one of which is adapted to be driven, the other section having one end open, said members being seated in said sections respectively, the last mentioned section including an internal flange with the teeth of the internal gear formed thereon, said sections being separable adjacent the face of the said pinion, a sleeve extending rigidly from the opposite face of said pinion and through the open end of said section of the casing on which the internal gear teeth are formed, the member in the other section having an axial aperture forming a lubricant chamber, a drive transmission shaft secured in said sleeve, and a closure plate carried by said pinion and extending over the inner end of the drive shaft.

KEITH MORRISON McPHEE.

REFERENCES CITED

The following references are of record in the file of this patent:

UNITED STATES PATENTS

| Number | Name | Date |
| --- | --- | --- |
| 1,770,744 | Morgan | July 15, 1930 |
| 2,352,776 | Dodge | July 4, 1944 |